March 1, 1927. 1,619,047
C. T. WEYMANN
WINDOW GLASS GUIDE FOR VEHICLES AND THE LIKE
Filed Dec. 4, 1922
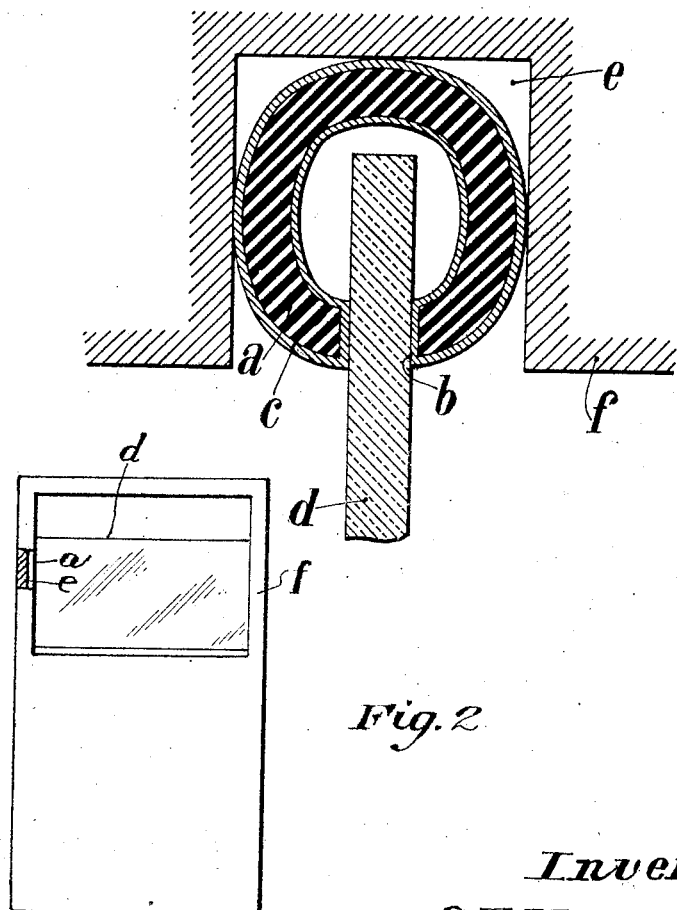
Inventor
C. T. Weymann,
By Marks & Clerk
Attys.

Patented Mar. 1, 1927.

1,619,047

UNITED STATES PATENT OFFICE.

CHARLES TORRES WEYMANN, OF PARIS, FRANCE.

WINDOW-GLASS GUIDE FOR VEHICLES AND THE LIKE.

Application filed December 4, 1922, Serial No. 604,950, and in France December 6, 1921.

Glasses without framing which are actually used in the manufacture of motor car bodies and especially those for the doors, are usually held in the slideways of the doors by means of felt strips embracing their edges. Now, at the end of a certain time, these felt strips become flattened, lose their original resiliency and the glasses are but imperfectly held in position, so that they vibrate or rattle.

It has also been suggested that the glasses be mounted in metallic frames of U-shaped cross section, the wings of which are internally lined with the felt strips, this frame being arranged in the rabbets of the posts of the framing, so as to permit the side displacement or swinging movement of the glass which, when closed, bears against or is supported by the horizontal cross-bar of the said framing as shown in U. S. patent to O'Brien No. 1,157,031, for example. These arrangements have the same disadvantages as those indicated above, that is to say the glass becomes loose and vibrates.

This invention relates to improvements in the guides or mountings for sliding glasses adapted to eliminate the above disadvantages, while at the same time simplifying their fitting up.

In the present invention, the edges of the glass are clamped between the edges of a longitudinal slot provided in the wall of a resilient and cylindrical fitting or formed by the contiguous edges of the latter. When the glass is moved laterally this fitting which engages in the rabbets of the framing is thus subjected to a transverse resilient distortion tending to draw together the edges of the slot and, consequently, to clamp, in the same way as pincers, the corresponding portion of the glass.

In the accompanying drawing Fig. 1 shows by way of example and in cross section the improvements forming the subject-matter of the present invention.

Fig. 2 is an elevation partly broken away of a vehicle door showing the invention applied thereto.

As indicated in the foregoing, the fitting or mounting comprises a hollow resilient cylinder $a$ provided with a slot $b$ formed by cutting its wall longitudinally, or by drawing together its edges (as in the case of a rolled metallic fitting). In the example illustrated, this fitting comprises by way of example, a tube $a$ slit longitudinally and encased in a felt or cloth lining $c$.

The corresponding edge of the glass $d$ is fitted in this slot $b$ and the resilient fitting $a$ is introduced in the rabbet $e$ of the framing $f$, thus causing a resilient distortion of its cross section. The reaction which takes place tends, consequently, to draw together the edges of the slots $b$ and therefore to firmly clamp the edge of the glass $d$.

These arrangements have also another important advantage. When closing the glass to cause it to bear against the horizontal cross-bar of the framing, the resilient fitting $a$ turns or twists in its rabbet $e$. It results therefrom that this rabbet $e$ can be of constant width, whilst in the known devices, it is necessary to have a rabbet of variable width permitting swinging movement of the glass when the lower part of the glass $d$ is moved into and out of engagement with the horizontal cross bar.

What I claim as my invention and desire to secure by Letters Patent is:

1. In combination, window guide having a groove, a window glass, a cylindrical rubber tube in said groove, said tube being adapted to retain its tubular form and to twist and rotate in said groove and having a longitudinal slot the edges of which are adapted to grip the glass, the action of the tube and groove serving to increase the gripping action of the tube on the glass when the glass is moved laterally, and a cloth covering around the tube to facilitate movement of the tube in the groove.

2. In combination, a window frame having a rabbet of uniform width, a slidable window glass, a substantial cylindrical rubber tube having a longitudinal slot, said glass being gripped between the edges of said slots, the rubber tube being in engagement with the side walls of said rabbet and adapted to twist or turn therein when the window glass is displaced laterally.

In testimony whereof I affix my signature.

CHARLES TORRES WEYMANN.